(12) United States Patent
Takeda et al.

(10) Patent No.: US 12,082,150 B2
(45) Date of Patent: Sep. 3, 2024

(54) TERMINAL, BASE STATION, AND COMMUNICATION METHOD

(71) Applicant: NTT DOCOMO, INC., Tokyo (JP)

(72) Inventors: Daiki Takeda, Tokyo (JP); Takuma Takada, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 300 days.

(21) Appl. No.: 17/597,114

(22) PCT Filed: Jul. 5, 2019

(86) PCT No.: PCT/JP2019/026829
§ 371 (c)(1),
(2) Date: Dec. 27, 2021

(87) PCT Pub. No.: WO2021/005647
PCT Pub. Date: Jan. 14, 2021

(65) Prior Publication Data
US 2022/0240221 A1 Jul. 28, 2022

(51) Int. Cl.
*H04W 68/02* (2009.01)
*H04W 52/02* (2009.01)

(52) U.S. Cl.
CPC ....... *H04W 68/02* (2013.01); *H04W 52/0229* (2013.01)

(58) Field of Classification Search
CPC .............. H04W 68/02; H04W 68/025; H04W 52/0229; H04W 52/0216; H04W 52/0219;
(Continued)

(56) References Cited

U.S. PATENT DOCUMENTS

| 2019/0239189 A1 | 8/2019 | Hwang et al. | |
| 2020/0137823 A1* | 4/2020 | Nam | H04W 52/0229 |
| 2021/0360529 A1* | 11/2021 | Yang | H04W 72/23 |

FOREIGN PATENT DOCUMENTS

WO 2018/174635 A1 9/2018

OTHER PUBLICATIONS

Lenovo, Motorola Mobility, UE-group wake-up signal for Rel-16 MTC, Apr. 8-12, 2019, 3GPP TSG RAN WG1 Meeting #96bis, R1-1904565, pp. 1-4, (Year: 2019).*

(Continued)

*Primary Examiner* — Farid Seyedvosoghi
(74) *Attorney, Agent, or Firm* — Osha Bergman Watanabe & Burton LLP

(57) ABSTRACT

A terminal includes a reception unit configured to receive, from a base station, information for requesting a terminal capability report related to a wake-up signal associated with a paging occasion and configuration information related to at least one of a first wake-up signal and a second wake-up signal, a transmission unit configured to transmit the terminal capability report related to the wake-up signal to the base station, and a control unit configured to determine a configuration of the first wake-up signal and a configuration of the second wake-up signal based on the configuration information related to the wake-up signal, and the reception unit receives the wake-up signal and paging associated with the wake-up signal from the base station, and the control unit determines the configuration of the first wake-up signal from a value based on the configuration of the second wake-up signal.

9 Claims, 14 Drawing Sheets

(58) Field of Classification Search
CPC ..... H04W 52/028; H04W 8/186; H04W 8/24; H04W 4/70; H04L 5/0053; H04L 5/0091; Y02D 30/70

See application file for complete search history.

(56) References Cited

OTHER PUBLICATIONS

International Search Report for corresponding International Application No. PCT/JP2019/026829, mailed Feb. 10, 2020 (5 pages).
Written Opinion for corresponding International Application No. PCT/JP2019/026829, mailed Feb. 10, 2020 (4 pages).
3GPP TS 36.211 V15.5.0; "3rd Generation Partnership Project; Technical Specification Group Radio Access Network; Evolved Universal Terrestrial Radio Access (E-UTRA); Physical channels and modulation (Release 15)"; Mar. 2019 (238 pages).
3GPP TS 38.300 V15.5.0; "3rd Generation Partnership Project; Technical Specification Group Radio Access Network; NR; NR and NG-RAN Overall Description; Stage 2 (Release 15)"; Mar. 2019 (97 pages).
Ericsson; "UE-group wake-up signal in LTE-MTC"; 3GPP TSG-RAN WG1 Meeting #95, R1-1812119; Spokane, U.S.A.; Nov. 12-16, 2018 (10 pages).
Office Action in the counterpart Chinese Application No. 201980098211.4, mailed May 24, 2023 (17 pages).
Huawei, HiSilicon: "Support of sub-groups for MWUS", 3GPP TSG RAN WG1 Meeting #94bis, R1-1810088, Chengdu, China, Oct. 8-12, 2018 (3 pages).
Lenovo, Motorola Mobility: "UE-group wake-up signal for Rel-16 MTC", 3GPP TSG RAN WG1 Meeting #96bis, R1-1904565, Xi'an, China, Apr. 8-12, 2019 (4 pages).
Office Action in Japanese Application No. 2021-530346, mailed Dec. 26, 2023 (13 pages).
Qualcomm Incorporated: "WUS grouping design overview and UE distribution", 3GPP TSG RAN WG2 #106, Tdoc R2-1906249, Reno, USA, May 13-17, 2019 (6 pages).
Office Action issued in counterpart Chinese Application No. 201980098211.4, mailed on Apr. 16, 2024 (15 pages).

\* cited by examiner

FIG. 16

```
UE-RadioPagingInfo-NB-r13 ::= SEQUENCE {
    ue-Category-NB-r13                      ENUMERATED {nb1}                              OPTIONAL,
    ...
    (A PART OF DESCRIPTIONS IS OMITTED)
    wakeUpSignal-r15                        ENUMERATED {true}                             OPTIONAL,
    wakeUpSignalMinGap-eDRX-r15             ENUMERATED {ms40, ms240, ms1000, ms2000}      OPTIONAL,
    wakeUpSignal-r16                        ENUMERATED {true}                             OPTIONAL,
    wakeUpSignalMinGap-eDRX-r16             ENUMERATED {ms40, ms240, ms1000, ms2000}      OPTIONAL,
    (A PART OF DESCRIPTIONS IS OMITTED)
}
```

FIG. 17

```
WUS-Config-r15 ::= SEQUENCE {
    maxDurationFactor-r15      ENUMERATED {one32th, one16th, one8th, one4th},
    maxDurationFactor-r16      ENUMERATED {one32th, one16th, one8th, one4th},
    numPOs-r15                 ENUMERATED {n1, n2, n4, spare1}              DEFAULT n1,
    numPOs-r16                 ENUMERATED {n1, n2, n4, spare1}              DEFAULT n1,
    freqLocation-r15           ENUMERATED {n0, n2, n4, spare1},
    freqLocation-r16           ENUMERATED {n0, n2, n4, spare1},
    timeOffsetDRX-r15          ENUMERATED {ms40, ms80, ms160, ms240},
    timeOffset-eDRX-Short-r15  ENUMERATED {ms40, ms80, ms160, ms240},
    timeOffset-eDRX-Long-r15   ENUMERATED {ms1000, ms2000}                  OPTIONAL    -- Need OP
    timeOffsetDRX-r16          ENUMERATED {ms40, ms80, ms160, ms240},
    timeOffset-eDRX-Short-r16  ENUMERATED {ms40, ms80, ms160, ms240},
    timeOffset-eDRX-Long-r16   ENUMERATED {ms1000, ms2000}                  OPTIONAL    -- Need OP
    (A PART OF DESCRIPTIONS IS OMITTED)
}
```

TERMINAL, BASE STATION, AND COMMUNICATION METHOD

TECHNICAL FIELD

The present invention relates to a terminal, a base station, and a communication method in a wireless communication system.

BACKGROUND ART

In New Radio (NR) (also referred to as "5G") which is a successor system to Long Term Evolution (LTE), technologies satisfying a large-capacity system, a high-speed data transmission rate, a low delay, simultaneous connection of multiple terminals, a low cost, power saving, and the like have been discussed (for example, Non-Patent Document 1).

Further, in the 3rd Generation Partnership Project (3GPP), extension of the technologies for Internet of Things (IoT) based on LTE is also discussed. For example, for the purpose of power saving of an IoT-UE (user equipment), that is, a UE corresponding to Narrow Band IoT (NB-IoT) or enhanced Machine Type Communication (eMTC), a wake-up signal (WUS) has been introduced in LTE-IoT of Release 15 (for example, Non-Patent Document 2).

CITATION LIST

Non-Patent Document

Non-Patent Document 1: 3GPP TS 38.300 V15.5.0 (2019-03)
Non-Patent Document 2: 3GPP TS 36.211 V15.5.0 (2019-03)

SUMMARY OF THE INVENTION

Problem to be Solved by the Invention

With respect to resources (for example, time resources, frequency resources, or time and frequency resources) for transmitting the WUS by the base station, that is, with respect to resources for receiving the WUS, in addition to the conventional fixed arrangement, flexible arrangement is discussed in Release 16. Further, it is also desirable to be able to flexibly configure whether or not a WUS (legacy WUS) of Release 15 and a WUS of Release 16 coexist in the same resource. However, there is a possibility of an increase in signaling between a network and a UE to implement a flexible configuration.

The present invention has been made in light of the foregoing, and it is an object of the present invention to improve efficiency of signaling in a wireless communication system.

Means for Solving Problem

According to the technology of the present disclosure, a terminal is provided. The terminal includes a reception unit configured to receive, from a base station, information for requesting a terminal capability report related to a wake-up signal associated with a paging occasion and configuration information related to at least one of a first wake-up signal and a second wake-up signal, a transmission unit configured to transmit the terminal capability report related to the wake-up signal to the base station, and a control unit configured to determine a configuration of the first wake-up signal and a configuration of the second wake-up signal based on the configuration information related to the wake-up signal. The reception unit receives the wake-up signal and paging associated with the wake-up signal from the base station, and the control unit determines the configuration of the first wake-up signal from a value based on the configuration of the second wake-up signal.

Effect of the Invention

According to the technology of the disclosure, it is possible to improve efficiency of signaling in a wireless communication system.

BRIEF DESCRIPTION OF DRAWINGS

FIG. 16 is an example (1) of a specification change according to an embodiment of the present invention;

FIG. 17 is an example (2) of a specification change according to an embodiment of the present invention;

MODE(S) FOR CARRYING OUT THE INVENTION

Hereafter, one or more embodiments of the present invention will be described with reference to the appended drawings. One or more embodiments to be described below are examples, and embodiments to which the present invention is applied are not limited to the following embodiments.

The conventional technology is appropriately used for an operation of a wireless communication system of an embodiment of the present invention. Here, the existing technology is, for example, the existing LTE but is not limited to the existing LTE. The term "LTE" used in this specification has a broad meaning including LTE-Advanced and schemes after LTE-Advanced (for example, NR) unless otherwise specified.

Also, according to an embodiment of the present invention to be described below, terms such as a synchronization signal (SS), a primary SS (PSS), a secondary SS (SSS), a physical broadcast channel (PBCH), a physical random access channel (PRACH) used in the existing LTE are used. This is for convenience of description, and signals, functions, or the like similar to them may be indicated by other names. The above terms in NR correspond to NR-SS, NR-PSS, NR-SSS, NR-PBCH, NR-PRACH, and the like. However, even a signal used for NR is not always indicated by "NR-".

Also, according to an embodiment of the present invention, a duplex scheme may be a Time Division Duplex (TDD) scheme, may be a Frequency Division Duplex (FDD) scheme, or may be other schemes (for example, Flexible Duplex or the like).

Further, according to an embodiment of the present invention, when a radio parameter or the like is "configured", it may mean that a predetermined value is pre-configured or may mean that a radio parameter notified from a base station 10 or a user terminal 20 may be configured.

Figure 1:
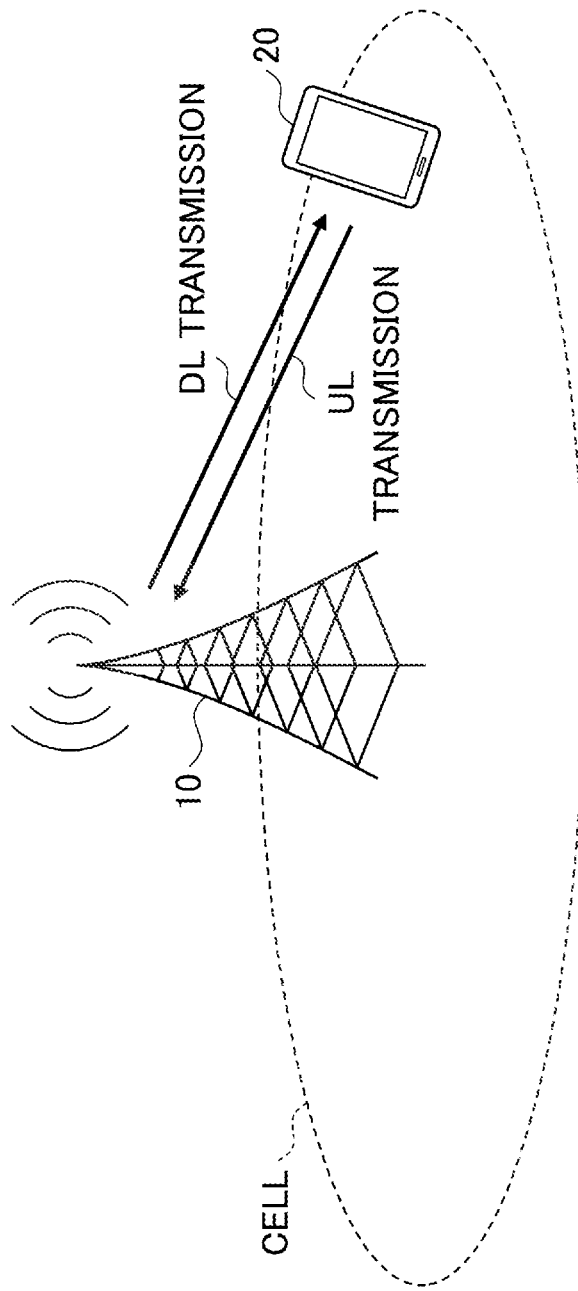
FIG. 1 is a diagram illustrating an example configuration of a wireless communication system according to an embodiment of the present invention.
Figure 2:
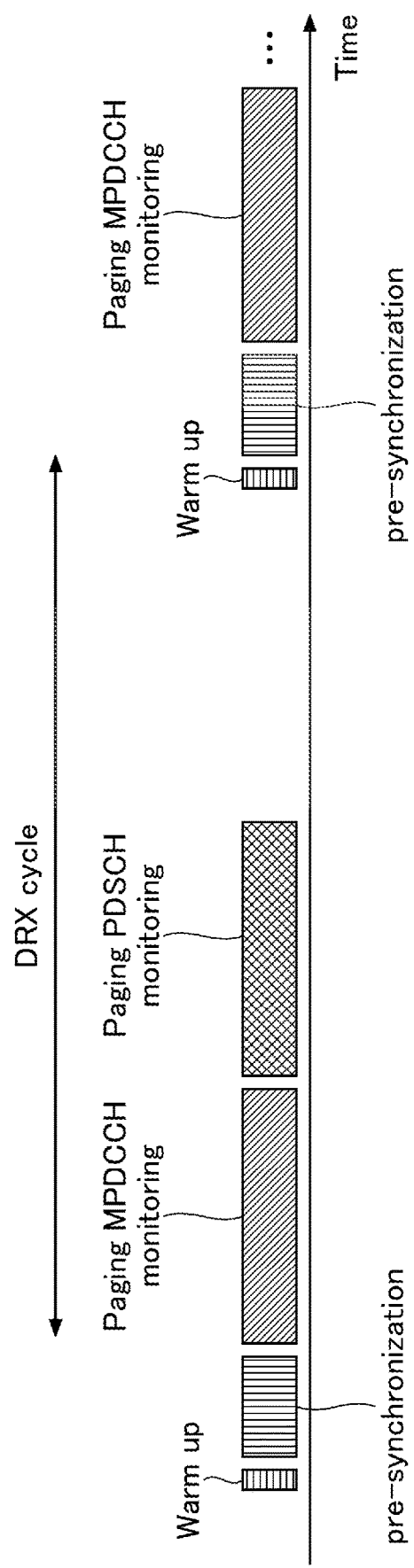
FIG. 2 is a diagram illustrating an example of a reception operation at the time of DRX.

FIG. 1 is a diagram for describing a wireless communication system according to an embodiment of the present invention. The wireless communication system according to the embodiment of the present invention includes a base station 10 and a terminal 20 as illustrated in FIG. 2. Although FIG. 2 illustrates one base station 10 and one terminal 20, a plurality of base stations 10 or a plurality of terminals 20 may be provided.

The base station 10 is a communication device that provides one or more cells and performs wireless communication with the terminal 20. Physical resources of a radio signal are defined by the time domain and the frequency domain, and the time domain may be defined by the number of OFDM symbols, and the frequency domain may be defined by the number of sub-bands or resources blocks. The base station 10 transmits a synchronization signal and system information to the terminal 20. The synchronization signal is, for example, an NR-PSS or an NR-SSS. The system information is transmitted, for example, through an NR-PBCH and is also called broadcast information. As illustrated in FIG. 2, the base station 10 transmits a control signal or data to the terminal 20 in downlink (DL) and receives a control signal or data from the terminal 20 in uplink (UL). Both the base station 10 and terminal 20 can transmit and receive signals by performing beam forming. Further, both the base station 10 and the terminal 20 can apply Multiple Input Multiple Output (MIMO) communication to DL or UL. Further, both the base station 10 and the terminal 20 may perform communication via a secondary cell (SCell) and a primary cell (PCell) through carrier aggregation (CA).

The terminal 20 is a communication device with a wireless communication function such as a smart phone, a mobile phone, a tablet, a mobile terminal, or a machine-to-machine (M2M) communication module. As illustrated in FIG. 2, the terminal 20 uses various kinds of communication services provided by the wireless communication system by receiving a control signal or data from the base station 10 in DL and transmitting a control signal or data to the base station 10 in UL.

As described above, various types of terminals can be used as the terminal 20, but the terminal 20 according to an embodiment of the present invention is assumed to be mainly an IoT-UE of Release 16 of LTE (or Release after Release 16). However, the terminal 20 is not limited to the IoT-UE of Release 16 of LTE (or Release after Release 16). Also, the assumed IoT-UE may be an NB-IoT UE or an eMTC UE.

FIG. 2 is a diagram illustrating an example of a reception operation at the time of DRX. Before the wake-up signal (WUS) is introduced, the terminal 20 in the idle state monitors paging occasions (POs) which occur periodically. Further, monitoring a PO may mean monitoring a paging PDCCH or monitoring a paging search space. In "pre-synchronization" illustrated in FIG. 2, the terminal 20 performs synchronization for receiving a paging. Then, the terminal 20 monitors a paging in an MTC physical downlink control channel (MPDCCH) and a physical downlink shared channel (PDSCH). In other words, it is necessary for the terminal 20 to execute a process of detecting and decoding the paging in the MPDCCH and the PDSCH, in the PO. Although FIG. 2 illustrates an operation of the eMTC-UE, for example, the NB-IoT-UE may operate similarly by replacing the MPDCCH with a narrowband PDCCH (NPDCCH) and replacing the PDSCH with a narrowband PDSCH (NPDCCH).

Figure 3:
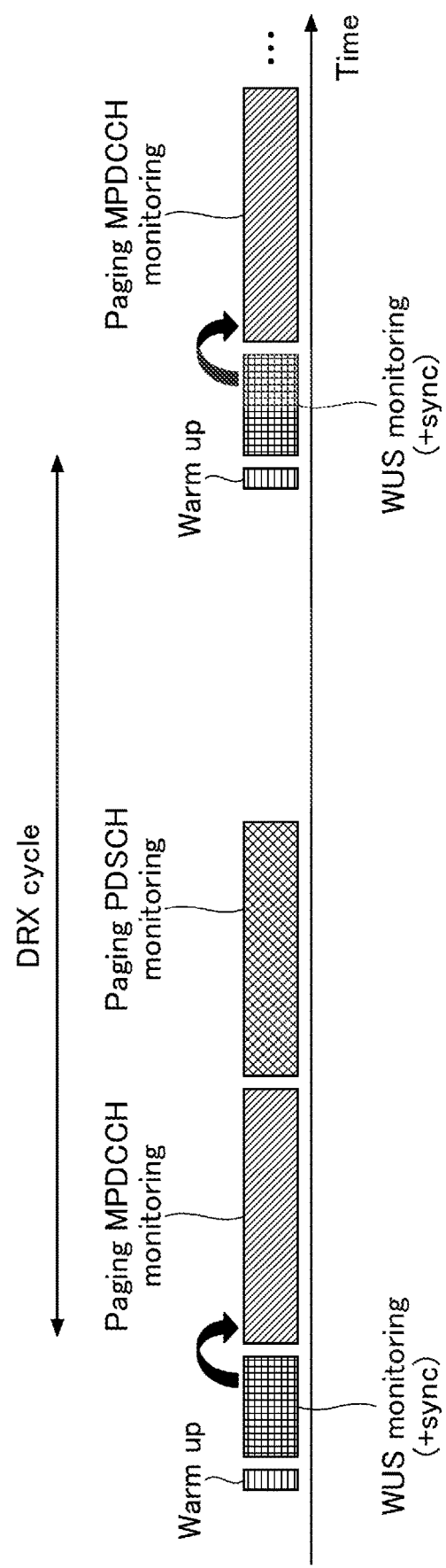
FIG. 3 is a diagram illustrating an example (1) of a reception operation at the time of DRX according to an embodiment of the present invention.

FIG. 3 is a diagram illustrating an example (1) of a reception operation at the time of DRX according to an embodiment of the present invention. The "WUS" illustrated in FIG. 3 is transmitted in association with one or more POs. In other words, the base station 10 can indicate, to the terminal 20, whether it is necessary to monitor the associated POs, in advance through a WUS by transmitting the WUS, in a case where it is desired to cause the terminal 20 to monitor paging. The terminal 20 in the idle state, which supports the WUS and has received the WUS configuration from the base station 10, monitors a WUS prior to paging and monitors the subsequent PO in a case where the WUS is detected. On the other hand, in a case where the WUS is not detected, the terminal 20 need not monitor the subsequent PO.

Therefore, the terminal 20 can skip the process of detecting and decoding the paging in the MPDCCH, in which paging is not actually transmitted, and the PDSCH, thereby reducing power consumption. A maximum WUS period to be described later may be configured by considering the coverage of the WUS and the MPDCCH/PDSCH. Although FIG. 3 illustrates an operation of the eMTC-UE, for example, the NB-IoT-UE may operate similarly by replacing the MPDCCH with the NPDCCH and replacing the PDSCH with the NPDSCH.

Figure 4:
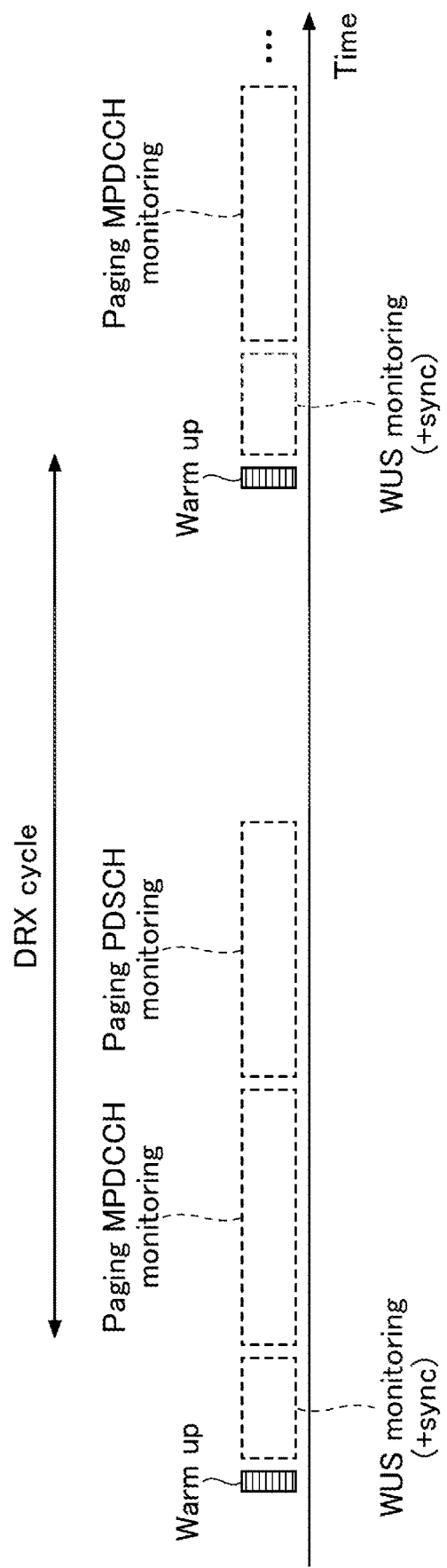
FIG. 4 is a diagram illustrating an example (2) of a reception operation at the time of DRX according to an embodiment of the present invention.

FIG. 4 is a diagram illustrating an example (2) of the reception operation at the time of DRX according to an embodiment of the present invention. FIG. 4 illustrates an operation in a case where the base station 10 does not transmit the WUS to the terminal 20. In a case where the base station 10 determines that it is not necessary to cause the terminal 20 to monitor paging, the base station 10 does not transmit the WUS to the terminal 20. In a case where the terminal 20 has not received the WUS, the terminal 20 need not monitor the associated PO. Therefore, the terminal 20 can skip the process of detecting the paging in the MPDCCH corresponding to the PO associated with the WUS, and the PDSCH. Further, the reduction in power consumed in the process of detecting the control channel and the data channel depends largely on the number of repetitions of the MPDCCH and the PDSCH. Therefore, in the operation scenario in which the number of repetitions is assumed to be large, the power consumption reduction effect of the WUS can be expected to increase. Although FIG. 4 illustrates the operation of the eMTC-UE, for example, the NB-IoT-UE may operate similarly by replacing the MPDCCH with the NPDCCH, and replacing the PDSCH with the NPDSCH.

In the WUS of Release 15, one or more POs are associated with one WUS. On the other hand, the PO is assumed to be common to a plurality of terminal 20. Therefore, all of a plurality of terminals 20 in the idle state that have detected the WUS are activated to monitor the paging PDCCH. In other words, it is possible to activate a plurality of user devices that are unlikely to be the destination of paging.

In this regard, according to an embodiment of the present invention related to LTE Release 16, grouping of the terminals 20 is performed based on a UE-ID or the like. In other words, the terminals 20 belonging to a certain group monitor only the WUS associated with the corresponding group. Accordingly, the number of terminals 20 that are activated even though they are not the paging destination can be reduced.

The group is identified by a UE group ID. Further, the terminal 20 that supports a Release 16_WUS also supports the WUS of Release 15. In other words, the terminal 20 that supports the Release 16_WUS can receive Release 16_WUS and execute related processing or can receive the WUS of Release 15 and execute related processing. Further, the group identifier may have other names instead of the UE group ID. For example, the group identifier may have a name such as a group ID, a WUS group ID, or a PO group ID.

Hereinafter, the WUS of Release 16 is referred to as a Release 16_WUS, and the WUS of Release 15 is referred to as a legacy WUS. In a case where they are not particularly distinguished, they are referred to as a WUS. The legacy WUS is also referred to as a legacy wake-up signal.

Also, the UE group ID is used to generate a sequence of the Release 16_WUS. The number of UE groups can be configured to the terminal 20 by the base station 10, and is, for example, broadcast from the base station 10 through system information (system information block (SIB)).

For example, multiplexing of the Release 16_WUS and the legacy WUS may be performed by, for example, any one or a combination of the following methods 1) to 3):
1) time division multiplexing (TDM);
2) frequency division multiplexing (FDM); and
3) single sequence code division multiplexing (CDM).

Also, multiplexing between a plurality of WUSs may be performed by, for example, any one or a combination of the following methods 1) to 3):
1) TDM;
2) FDM; and
3) single sequence CDM.

Note that the single sequence CDM is, for example, a technique of multiplying the WUS sequence serving as a base by an orthogonal code, that is, a code having a cross correlation of 0 or a small cross correlation, generating a plurality of WUS sequences, and selecting and transmitting any one of the generated WUS sequences.

In the embodiment of the present invention, a method of allocating the WUS resources (time and frequency resources) which are resources used for the base station 10 to transmit the WUS to the terminal 20 (resources used for the terminal 20 to monitor the WUS) will be described.

In the embodiment of the present invention, a maximum of two WUS resources are configured in each domain of the time domain and the frequency domain. Here, "configuration" may mean that the WUS resources are configured to the terminal 20 by the base station 10, or may mean that the base station 10 determines each WUS resource.

Also, a plurality of WUSs may be multiplexed by using CDM (for example, single sequence CDM) in one WUS resource.

Figure 5:
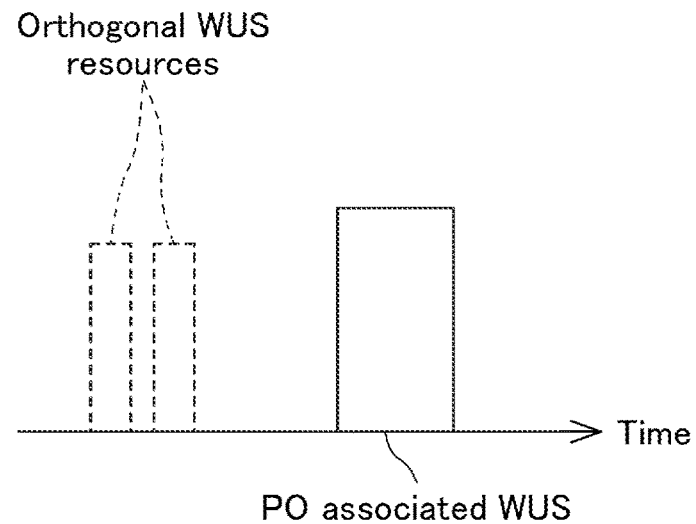
FIG. 5 is a diagram illustrating an example (1) of WUS resource allocation according to an embodiment of the present invention.
Figure 6:
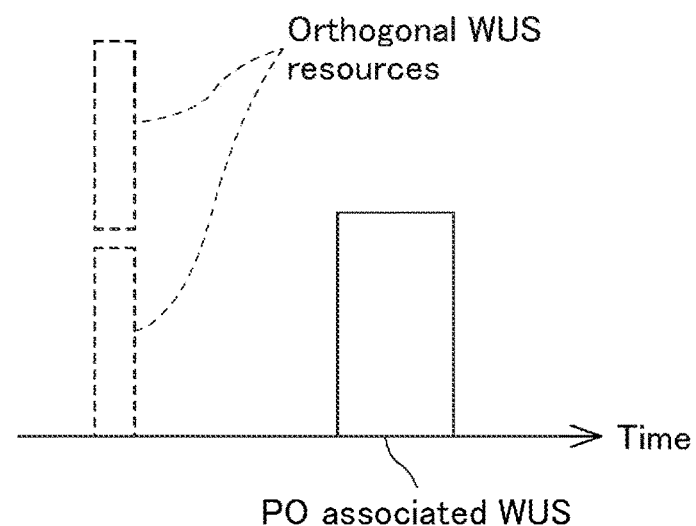
FIG. 6 is a diagram illustrating an example (2) of WUS resource allocation according to an embodiment of the present invention.
Figure 7:
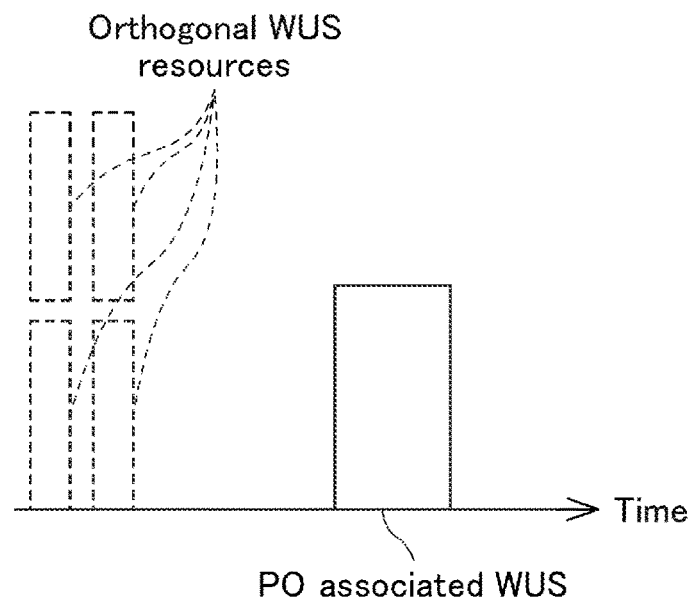
FIG. 7 is a diagram illustrating an example (3) of WUS resource allocation according to an embodiment of the present invention.

FIGS. 5, 6, and 7 illustrate examples in which a plurality of orthogonal WUS resources are configured. In FIGS. 6, 5, and 7, a vertical axis indicates a frequency, and a horizontal axis indicates a time. Further, "orthogonal" means what resources do not overlap.

FIG. 5 illustrates an example in which two WUS resources are configured in the time direction. FIG. 6 illustrates an example in which two WUS resources are configured in the frequency direction. FIG. 7 illustrates an example in which four WUS resources are configured.

FIGS. 8 to 14 illustrate an example in which the Release 16_WUS or the legacy WUS is transmitted from the base station 10 through the WUS resources described above. Although FIGS. 8 to 14 illustrate examples in which the legacy WUS is included, the legacy WUS may be omitted.

Figure 8:
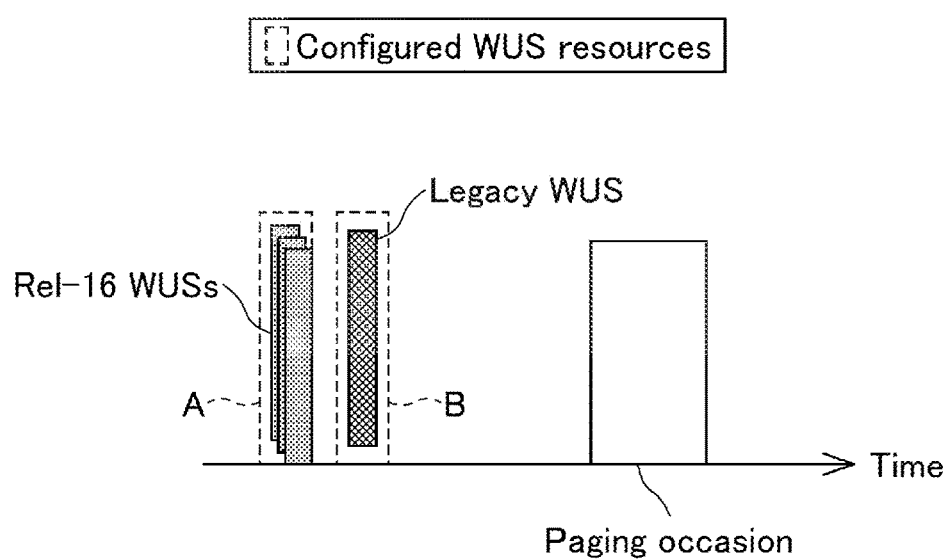
FIG. 8 is a diagram illustrating an example (4) of WUS resource allocation according to an embodiment of the present invention.

FIG. 8 illustrates an example in which a WUS resource A and a WUS resource B are arranged in the time direction. As illustrated in FIG. 8, a plurality of CDM-multiplexed Release 16_WUSs are transmitted through the WUS resource A, and the legacy WUS is transmitted through the WUS resource B. Further, one Release 16_WUS may be transmitted without multiplexing a plurality of Release 16_WUSs through the WUS resource A.

Figure 9:
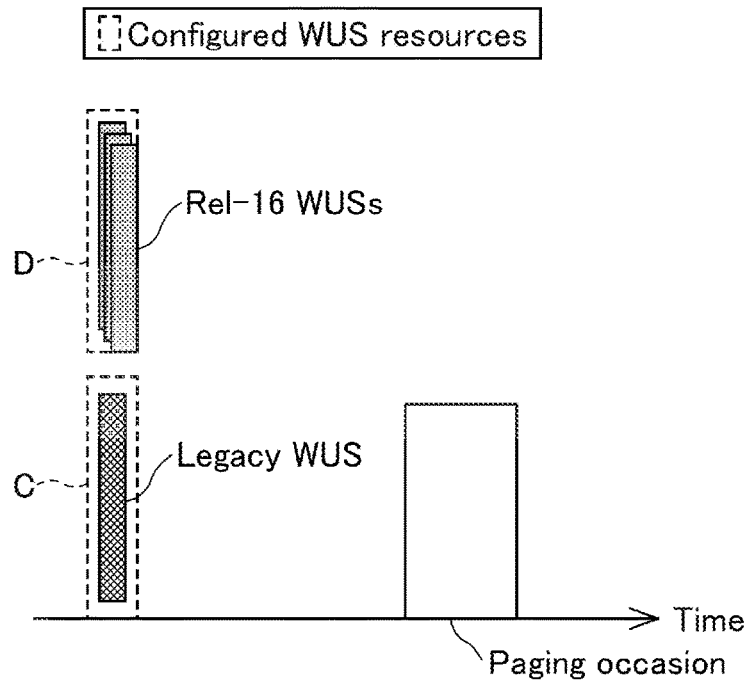
FIG. 9 is a diagram illustrating an example (5) of WUS resource allocation according to an embodiment of the present invention.

FIG. 9 illustrates an example in which a WUS resource C and a WUS resource D are arranged in the frequency direction. As illustrated in FIG. 9, the legacy WUS is transmitted through the WUS resource C, and a plurality of Release 16_WUSs multiplexed by CDM are transmitted through the WUS resource D. Further, one Release 16_WUS may be transmitted without multiplexing a plurality of Release 16_WUSs through the WUS resource D.

Figure 10:
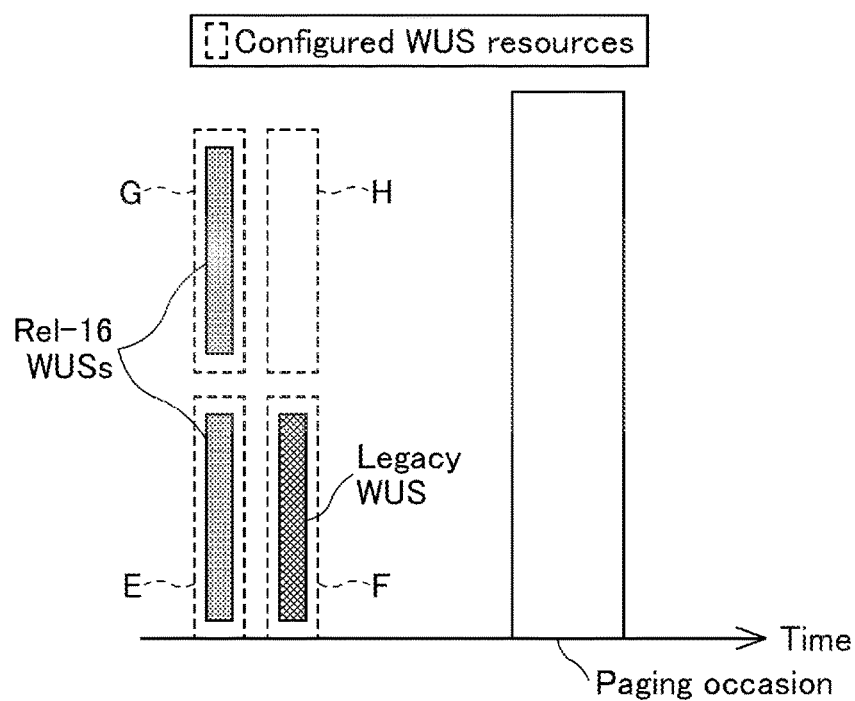
FIG. 10 is a diagram illustrating an example (6) of WUS resource allocation according to an embodiment of the present invention.

FIG. 10 illustrates an example in which a WUS resource E, a WUS resource F, a WUS resource G, and a WUS resource H are arranged in the time direction and the frequency direction. As illustrated in FIG. 10, the Release 16_WUS is transmitted through each of the WUS resource E and G, and the legacy WUS is transmitted through the WUS resource F.

Figure 11:
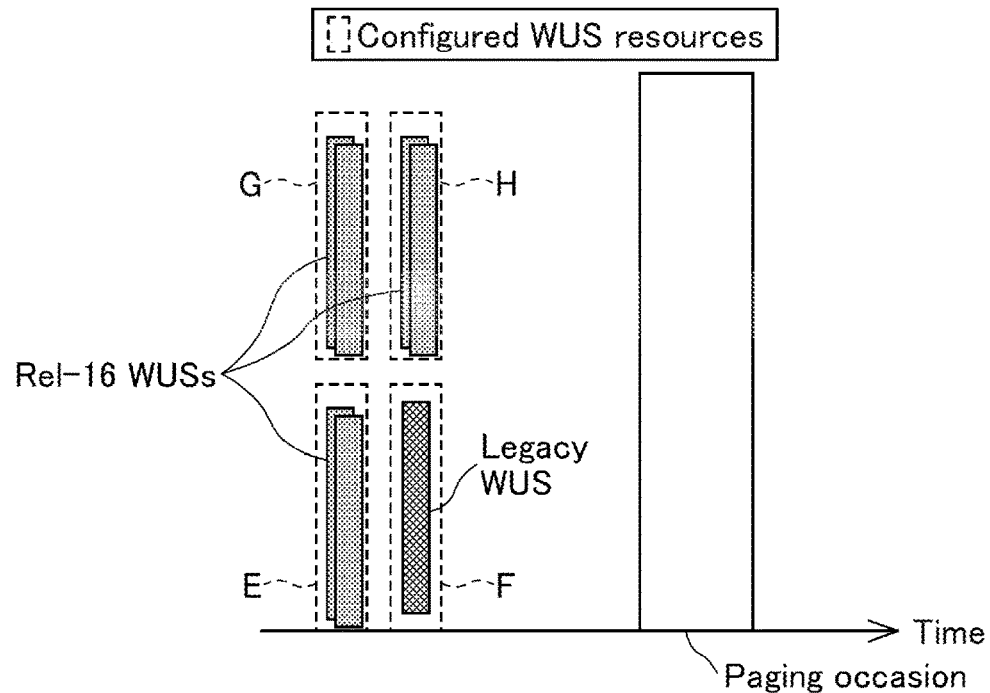
FIG. 11 is a diagram illustrating an example (7) of WUS resource allocation according to an embodiment of the present invention.

FIG. 11 illustrates an example in which the WUS resource E, the WUS resource F, the WUS resource G, and the WUS resource H are arranged in the time direction and the frequency direction. As illustrated in FIG. 11, the Release 16_WUS is transmitted through each of the WUS resource E and G, and the legacy WUS is transmitted through the WUS resource F.

Figure 12:
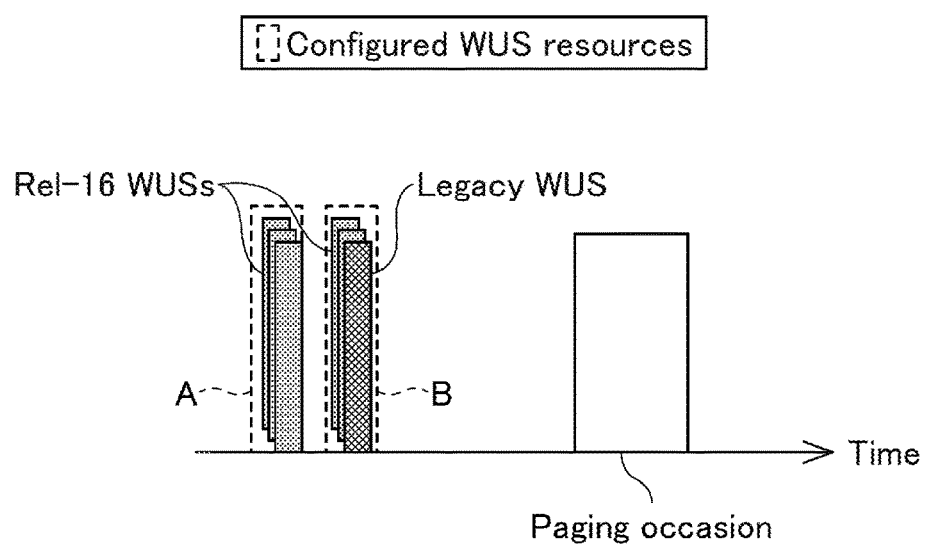
FIG. 12 is a diagram illustrating an example (8) of WUS resource allocation according to an embodiment of the present invention.

FIG. 12 illustrates an example in which the WUS resource A and the WUS resources B are arranged in the time direction. As illustrated in FIG. 12, a plurality of CDM-multiplexed Release 16_WUSs are transmitted through the WUS resource A, and the legacy WUS and a plurality of Release 16_WUSs which are CDM-multiplexed are transmitted through the WUS resources B. Further, one Release 16_WUS may be transmitted without multiplexing a plurality of Release 16_WUSs through the WUS resource A or the WUS resources B.

Figure 13:
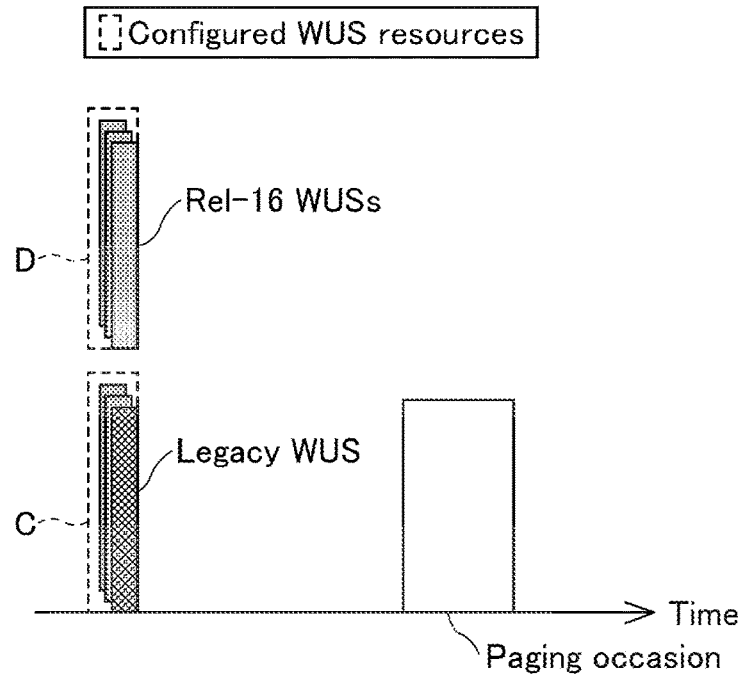
FIG. 13 is a diagram illustrating an example (9) of WUS resource allocation according to an embodiment of the present invention.

FIG. 13 illustrates an example in which the WUS resource C and the WUS resource D are arranged in the frequency direction. As illustrated in FIG. 9, the legacy WUS and a plurality of the Release 16_WUSs, which are multiplexed by CDM, are transmitted through the WUS resource C, and a plurality of CDM-multiplexed Release 16_WUSs are transmitted through the WUS resource D. Further, one Release 16_WUS may be transmitted without multiplexing a plurality of Release 16_WUSs through the WUS resource C or the WUS resource D.

As illustrated in FIGS. 12 and 13, for the Release 16_WUS, a maximum of two orthogonal WUS resources may be configured in each of the time domain and the frequency domain. Further, a plurality of WUSs may be multiplexed into one WUS resource specified in the time domain and the frequency domain using the single sequence CDM.

Figure 14:
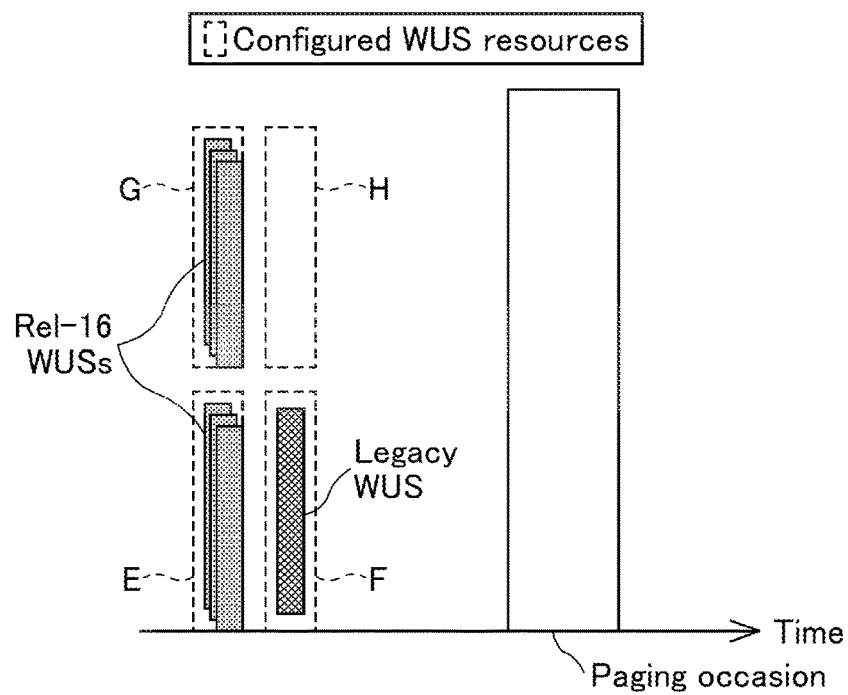
FIG. 14 is a diagram illustrating an example (10) of WUS resource allocation according to an embodiment of the present invention.

FIG. 14 illustrates an example in which the WUS resource E, the WUS resource F, the WUS resource G, and the WUS resource H are arranged in the time direction and the frequency direction. As illustrated in FIG. 14, a plurality of CDM-multiplexed Release 16_WUSs are transmitted through each of the WUS resource E and the WUS resource G, and the legacy WUS is transmitted through the WUS resource F.

Here, the terminal 20 may monitor only one WUS resource specified in the time domain and the frequency domain. Therefore, the terminal 20 may detect the WUS through the following steps 1 to 3.

Step 1) the UE group ID is configured to the terminal 20 that supports the Release 16_WUS. A gap configuration between the PO and the WUS may be executed together.

Step 2) The terminal 20 determines the positions of the WUS resources in the time domain and the frequency domain to monitor based on the configured UE group ID.

Step 3) The terminal 20 monitors the determined one WUS resource in the time domain and the frequency domain.

For radio resource control (RRC) signaling related to the configurations of the Release 16_WUS, for example, the terminal 20 that supports the Release 16_WUS may support signaling related to the Release 15_WUS. Also, for example, parameters related to a WUS transmission time timing may be common to Release 15 and Release 16 and efficiently signaled.

Figure 15:
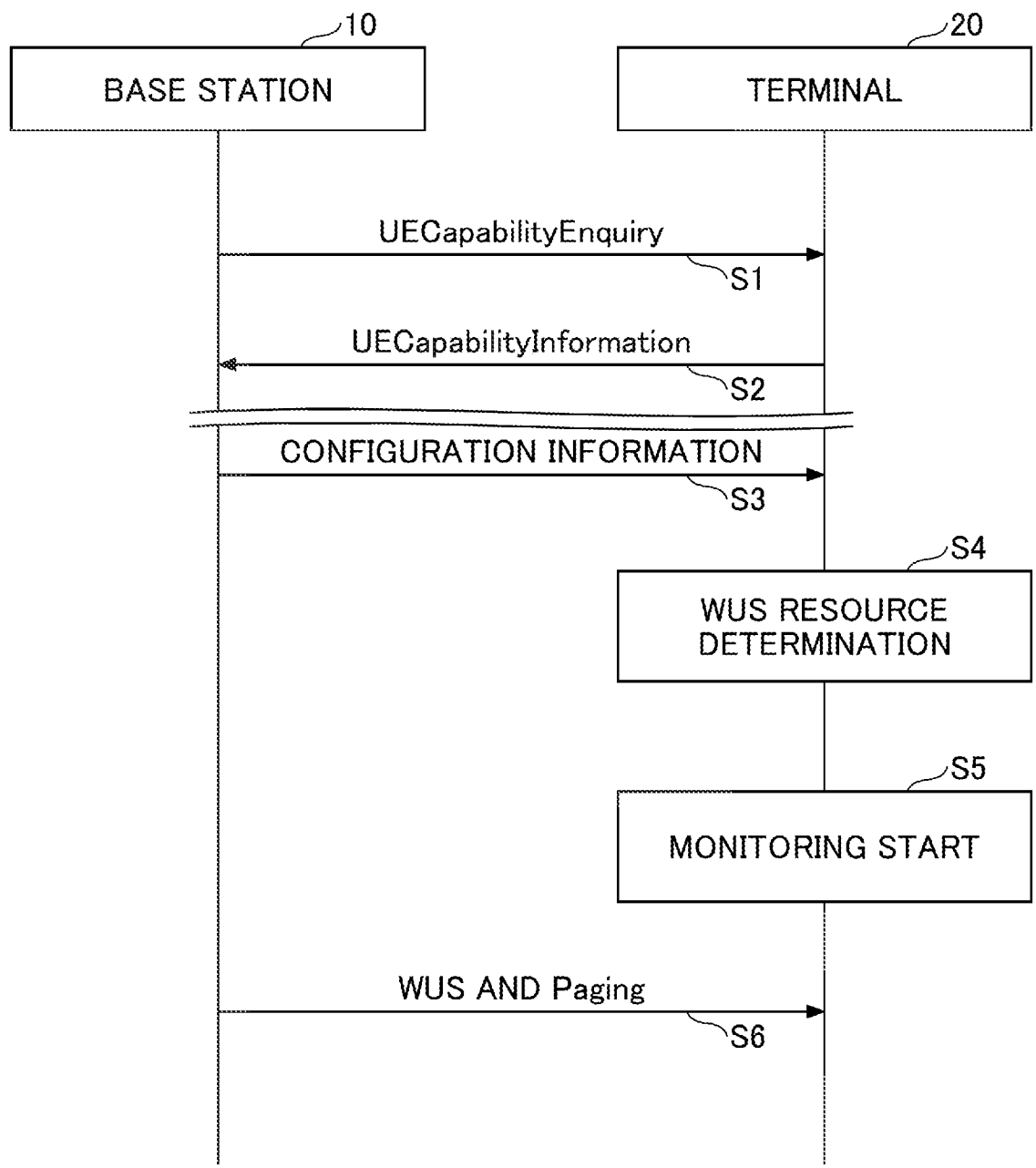
FIG. 15 is a sequence diagram for explaining an example of monitoring WUS according to an embodiment of the present invention.

FIG. 15 is a sequence diagram for describing an example of monitoring the WUS according to an embodiment of the present invention. In step S1 illustrated in FIG. 15, the base station 10 transmits "UECapabilityEnquiry", that is, a UE capability inquiry to the terminal 20. Then, in step S2, the terminal 20 transmits "UECapabilityInformation", that is, a UE capability report to the base station 10. "UECapabilityInformation" includes the UE capabilities that the terminal 20 supports. The base station 10 specifies the supported UE capabilities based on received "UECapabilityInformation".

FIG. 16 is an example (1) of a specification change according to an embodiment of the present invention. For example, "UECapabilityInformation" reported from the terminal 20 to the base station 10 in step S2 illustrated in FIG. 15 may include an information element "UE-RadioPagingInfoNB-r13" illustrated in FIG. 16. As illustrated in FIG. 16, "UE-RadioPagingInfoNB-r13" may include "wakeUpSignal-r15" indicating that the Release 15_WUS is supported and "wakeUpSignal-r16" indicating that the Release 16_WUS is supported.

Also, as illustrated in FIG. 16, "UE-RadioPagingInfoNB-r13" may include: a parameter "wakeUpSignalMinGap-eDRX-r15" indicating the shortest time interval supported by the UE between a first PO associated with the Release 15_WUS and the WUSs; and a parameter "wakeUpSignalMinGap-eDRX-r16" indicating the shortest time interval supported by the UE between a first PO associated with the Release 16_WUS and the WUSs. The terminal 20 may determine the configuration of the Release 16_WUS from the same value as of the parameter "wakeUpSignalMinGap-eDRX-r15", or from an offset based on "wakeUpSignalMinGap-eDRX-r15".

In other words, signaling related to the Release 15_WUS and signaling related to the Release 16_WUS may be defined separately. The information element "UE-RadioPagingInfoNB-r13" illustrated in FIG. 16 is signaling used by the NB-IoT-UE. For example, signaling related to the WUS may be defined in the eMTC-UE through the information element "UE-RadioPagingInfo-r12", similarly to NB-IoT-UE instead of "UE-RadioPagingInfoNB-r13".

The description continues with reference back to FIG. 15. In step S3 illustrated in FIG. 15, the base station 10 transmits configuration information related to the WUS to the terminal 20. The configuration information related to the WUS may be system information, for example, "SystemInformationBlockType2" or "SystemInformationBlockType2-NB-r13". Further, step S3 may be executed before step S1 and step S2.

FIG. 17 is an example (2) of a specification change according to an embodiment of the present invention. For example, the "configuration information" reported from the terminal 20 to the base station 10 in step S3 illustrated in FIG. 15 may include an information element "WUS-Config-r15" illustrated in FIG. 17. As illustrated in FIG. 17, "WUS-Config-r15" includes a parameter "maxDurationFactor-r15" indicating a maximum interval length of the Release 15_WUS and a parameter "maxDurationFactor-r16" indicating a maximum interval length of the Release 16_WUS. The "WUS-Config-r15" may include a parameter "numPOs-r15" indicating the number of consecutive POs associated with the Release 15_WUS and a parameter "numPOs-r16" indicating the number of consecutive POs associated with the Release 16_WUS. Also, the "WUS-Config-r15" may include a parameter "freqLocation-r15" indicating the position of the Release 15_WUS in the frequency domain and a parameter "freqLocation-r16" indicating the position of the Release 16_WUS in the frequency domain. Further, the "WUS-Config-r15" may include parameters "timeOffset-DRX-r15", "timeOffset-eDRX-Short-r15", and "timeOffset-eDRX-Long-r15" indicating the time intervals between the Release 15_WUS and the first associated PO and parameters "timeOffsetDRX-r16", "timeOffset-eDRX-Short-r16", and "timeOffset-eDRX-Long-r16" indicating the time intervals between the Release 16_WUS and the first associated PO.

In other words, signaling related to the Release 15_WUS and signaling related to the Release 16_WUS may be defined separately. The information element the "WUS-Config-r15" illustrated in FIG. 17 is signaling used by the eMTC-UE. For example, signaling related to the WUS may be defined in the NB-IoT-UE similarly to the eMTC-UE through information element the "WUS-Config-NB-r15" instead of the "WUS-Config-r15".

Here, in a case where values the same as those of the Release 15_WUS are configured in the configurations related to the Release 16_WUS, included in the "WUS-Config-r15" or the like, that is, the time offset ("timeOff-setDRX-r16"), the period ("maxDurationFactor-r16"), the frequency position ("freqLocation-r16"), the number of Pos ("numPOs-r16"), or the like, the base station 10 need not indicate, to the terminal 20, the configurations related to the Release 16_WUS. For example, in a case where the configurations related to the Release 16_WUS is not indicated, the terminal 20 may, as a default operation, use the configurations of the Release 15_WUS as the configurations of the Release 16_WUS.

Also, for example, the indication of the Release 16_WUS configurations may be specified as an option, assuming a case in which individual configurations are supported in the Release 15_WUS and the Release 16_WUS.

Further, for example, in a case where the configurations of the Release 15_WUS and the configurations of the Release 16_WUS are both indicated, the configurations of the Release 16_WUS may be the definition based on the configurations of the Release 15_WUS. For example, the time offset may be the same value as the time interval of the Release 15_WUS or may be an offset based on the time interval of the Release 15_WUS. For example, the period and the number of POs may be same values as those of the Release 15_WUS or may be values (for example, integer multiples) based on the Release 15_WUS. For example, the frequency position may be the same value as that of the Release 15_WUS, or the frequency position of the Release 16_WUS may be determined from the position excluding the frequency position of the Release 15_WUS.

In a case where "wakeUpSignal-r16" indicating that the Release 16_WUS is supported as illustrated in FIG. 16 is "true", "true" may be regarded as being set in "wakeUpSignal-r15" regardless of notification content, or only "wakeUpSignal-r16" may be notified of without notifying of "wakeUpSignal-r15".

The description continues with reference back to FIG. 15. In step S4 illustrated in FIG. 15, the terminal 20 determines the WUS resources based on the configuration information related to the WUS. Then, the terminal 20 starts monitoring the determined WUS resources (S5). The base station 10 transmits the WUS and the paging to the terminal 20, and the terminal 20 receives the WUS through the determined WUS resources and then receives the paging (S6).

According to the above-described embodiment, the base station 10 and the terminal 20 can efficiently transmit and receive the signaling of the configurations related to the Release 16_WUS using the configurations related to the Release 15_WUS.

In other words, the signaling efficiency in the wireless communication system can be improved.

(Device Configuration)

Next, function configuration examples of a base station 10 and a user terminal 20 that execute the processes and the operations described above will be described. The base station 10 and the user terminal 20 have functions for implementing the embodiments described above. However, each of the base station 10 and the user terminal 20 may have only some of the functions in the embodiment.

<Base Station 10>

Figure 18:
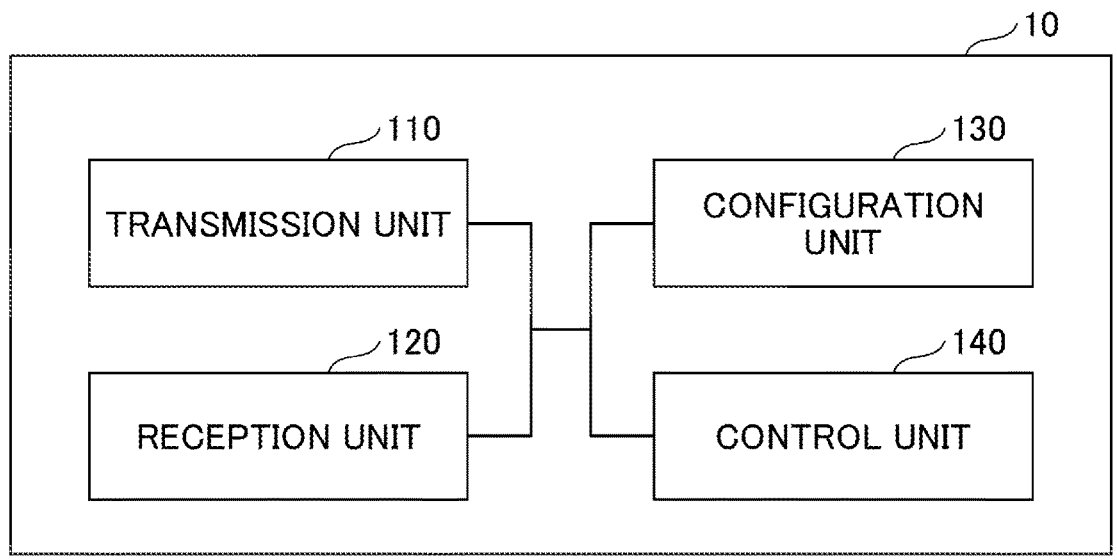
FIG. 18 is a diagram illustrating an example of a functional configuration of a base station 10 according to an embodiment of the present invention.

FIG. 18 is a diagram illustrating an example of a functional configuration of the base station 10 according to an embodiment of the present invention. As illustrated in FIG. 18, the base station 10 includes a transmission unit 110, a reception unit 120, a configuration unit 130, and a control unit 140. The functional configuration illustrated in FIG. 18 is only an example. A functional classification and names of the functional unit may be any classification and any names as long as the operation according to an embodiment of the present invention can be executed.

The transmission unit 110 includes a function of generating a signal to be transmitted to the user terminal 20 side and transmitting the signal wirelessly. Further, the transmission unit 110 transmits an inter-network node message to other network nodes. The reception unit 120 includes a function of receiving various kinds of signals transmitted from the user terminal 20 and acquiring, for example, higher layer information from the received signals. Further, the transmission unit 110 includes a function of transmitting NR-PSS, NR-SSS, NR-PBCH, and DL/UL control signals or the like to the user terminal 20. Also, the reception unit 120 receives the inter-network node message from other network nodes.

The configuration unit 130 stores configuration information set in advance and various kinds of configuration information to be transmitted to the user terminal 20. For example, content of the configuration information is information or the like related to the WUS transmission configuration and the paging transmission configuration corresponding to the UE capability of the terminal 20.

As described in the embodiment, the control unit 140 performs control related to the WUS and the paging to be transmitted to the terminal 20 as described in the embodiment. The functional unit related to signal transmission in the control unit 140 may be included in the transmission unit 110, and the functional unit related to signal reception in the control unit 140 may be included in the reception unit 120.

<User Terminal 20>

Figure 19:
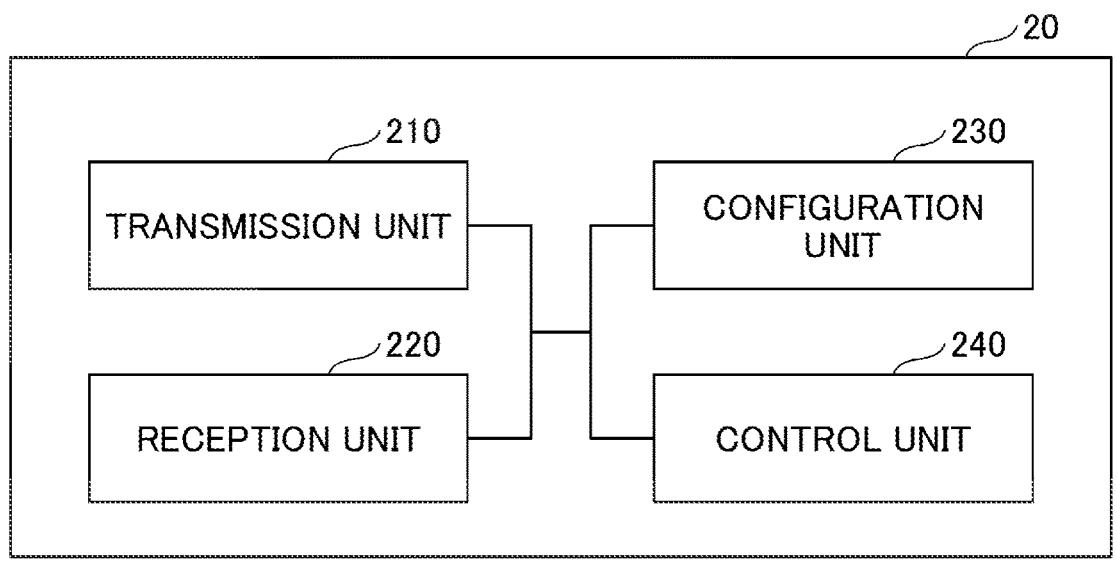
FIG. 19 is a diagram illustrating an example of a functional configuration of a terminal 20 according to an embodiment of the present invention.

FIG. 19 is a diagram illustrating an example of a functional configuration of the user terminal 20 in an embodiment of the present invention. As illustrated in FIG. 19, the user terminal 20 includes a transmission unit 210, a reception unit 220, a configuration unit 230, and a control unit 240. The functional configuration illustrated in FIG. 19 is only an example. A functional classification and names of the functional unit may be any classification and any names as long as the operation according to an embodiment of the present invention can be executed.

The transmission unit 210 generates a transmission signal from transmission data and transmits the transmission signal wirelessly. The reception unit 220 wirelessly receives various kinds of signals and acquires higher layer signals from received physical layer signals. The reception unit 220 includes a function of receiving NR-PSS, NR-SSS, NR-PBCH, and DL/UL/SL control signals or the like transmitted from the base station 10. Further, for example, the transmission unit 210 transmits a physical sidelink control channel (PSCCH), a physical sidelink shared channel (PSSCH), a physical sidelink discovery channel (PSDCH), a physical sidelink broadcast channel (PSBCH), and the like to other user terminals 20 as D2D communication, and the reception unit 120 receives PSCCH, PSSCH, PSDCH, PSBCH, and the like from the other user terminals 20.

The configuration unit 230 stores various kinds of configuration information received from the base station 10 by the reception unit 220. The configuration unit 230 also stores configuration information set in advance. For example, the content of the configuration information is information or the like related to the WUS reception configurations and the paging reception configurations corresponding to the UE capabilities of the terminal 20.

As described in the embodiment, the control unit 240 performs control related to the reception of the WUS and the paging as described in the embodiment. The functional unit related to signal transmission in the control unit 240 may be included in the transmission unit 210, and the functional unit related to signal reception in the control unit 240 may be included in the reception unit 220.

(Hardware Configuration)

In the block diagrams (FIGS. 18 and 19) used for the description of the embodiment, the blocks of the functional units are illustrated. The functional blocks (configuring units) are implemented by any suitable combination of hardware and/or software. A device of implementing each functional block is not particularly limited. In other words, each functional block may be implemented by one device which is physically or logically combined or may be implemented by a plurality of devices, that is, two or more devices which are physically and/or logically separated and are directly or indirectly connected (for example, a wired and/or wireless manner). The function block may be implemented by combining software with the one device or the plurality of devices.

The functions include determining, deciding, judging, computing, calculating, processing, deriving, investigating, searching, confirming, receiving, transmitting, outputting, accessing, resolving, selecting, choosing, establishing, comparing, assuming, expectation, regarding, broadcasting, notifying, communicating, forwarding, configuring, reconfiguring, allocating, mapping, assigning, and the like but are not limited thereto. For example, a functional block (functional unit) that enables transmission is referred to as a transmission unit or a transmitter. In any case, as described above, an implementation method is not particularly limited.

Figure 20:
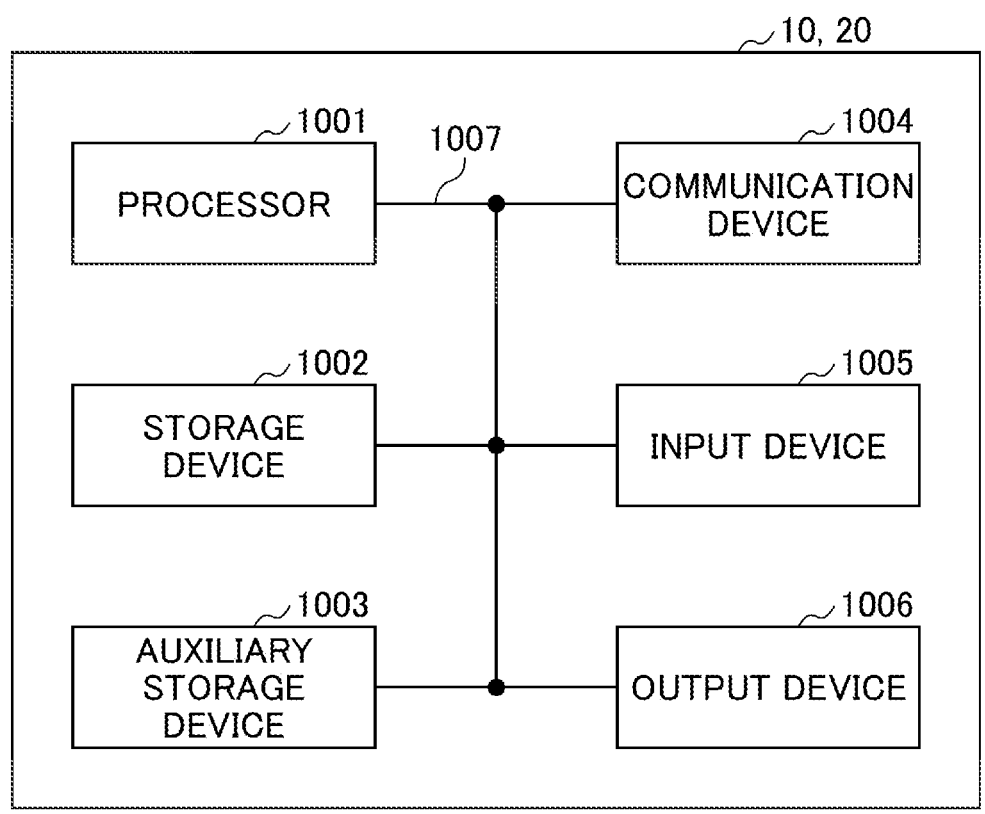
FIG. 20 is a diagram illustrating an example of a hardware configuration of each of a base station 10 or a terminal 20 according to an embodiment of the present invention.

For example, the base station 10, the user terminal 20, or the like in one embodiment of the present disclosure may function as a computer for processing the present disclosure's wireless communication method. FIG. 20 is a diagram illustrating an example of a hardware configuration of the base station 10 and the user terminal 20 according to an embodiment of the present disclosure. Each of the base station 10 and the user terminal 20 may be physically configured as a computer device including a processor 1001, a storage device 1002, an auxiliary storage device 1003, a communication device 1004, an input device 1005, an output device 1006, a bus 1007, and the like.

In the following description, the term "device" can be read as a circuit, device, unit, or the like. The hardware configuration of each of the base station 10 and the user terminal 20 may be configured to include one or more devices illustrated in the drawing or may be configured without including some devices.

Each function in each of the base station 10 and the user terminal 20 is implemented such that predetermined software (program) is read on hardware such as the processor 1001 and the storage device 1002, and the processor 1001 performs an operation and controls communication by the communication device 1004 and reading and/or writing of data in the storage device 1002 and the auxiliary storage device 1003.

For example, the processor 1001 operates an operating system and controls the entire computer. The processor 1001 may be configured with a central processing unit (CPU) including an interface with a peripheral device, a control device, an operation device, a register, and the like. For example, the control unit 140, the control unit 240, and the like described above may be implemented by the processor 1001.

Further, the processor 1001 reads a program (program code), a software module, or data from at least one of the auxiliary storage device 1003 and/or the communication device 1004 out to the storage device 1002, and executes various types of processes according to them. A program causing a computer to execute at least some of the operations described in the above embodiment is used as the program. For example, the control unit 140 of the base station 10 illustrated in FIG. 18 may be implemented by a control program that is stored in the storage device 1002 and that operates on the processor 1001. Further, for example, the control unit 240 of the user terminal 20 illustrated in FIG. 19 may be implemented by a control program which is stored in the storage device 1002 and operates on the processor 1001. Various types of processes have been described as being performed by one processor 1001 but may be performed simultaneously or sequentially by two or more processors 1001. The processor 1001 may be implemented by one or more chips. The program may be transmitted from a network via an electric communication line.

The storage device 1002 is a computer readable recording medium and configured with at least one of a read only memory (ROM), an erasable programmable ROM (EPROM), an electrically erasable programmable ROM (EEPROM), a random access memory (RAM), and the like. The storage device 1002 is also referred to as a "register", a "cache", a "main memory", or the like. The storage device 1002 can store programs (program codes), software modules, or the like which are executable for carrying out the communication method according to an embodiment of the present disclosure.

The auxiliary storage device 1003 is a computer-readable recording medium and may be configured with, for example, at least one of an optical disk such as a compact disc ROM (CD-ROM), a hard disk drive, a flexible disk, a magneto-optical disk (for example, a compact disk, a digital versatile disk, or a Blu-ray (registered trademark) disc, a smart card, a flash memory (for example, a card, a stick, or a key drive), a floppy (registered trademark) disk, a magnetic strip, and the like. The storage medium may be, for example, a database, a server, or any other appropriate medium including at least one of the storage device 1002 and the auxiliary storage device 1003.

The communication device 1004 is hardware (a transceiving device) for performing communication between computers via at least one of a wired network or a wireless network and is also referred to as a "network device", a "network controller", a "network card", a "communication module", or the like. The communication device 1004 may include a high-frequency switch, a duplexer, a filter, a frequency synthesizer, or the like in order to implement at least one of frequency division duplex (FDD) and time division duplex (TDD). For example, a transceiving antenna, an amplifying unit, a transmitting/reception unit, a transmission line interface, or the like may be implemented by the communication device 1004. The transmission/reception unit may be separately (physically or logically) implemented as a transmission unit and a reception unit.

The input device 1005 is an input device (for example, a keyboard, a mouse, a microphone, a switch, a button, a sensor, or the like) that receives an input from the outside. The output device 1006 is an output device (for example, a display, a speaker, an LED lamp, or the like) that performs output to the outside. The input device 1005 and the output device 1006 may be integrated (for example, a touch panel).

The respective devices such as the processor 1001 and the storage device 1002 are connected via the bus 1007 to communicate information with each other. The bus 1007 may be configured as a single bus or may be configured with a plurality of buses between the devices.

Further, each of the base station 10 and the user terminal 20 may be configured to include hardware such as a microprocessor, a digital signal processor (DSP), an application specific integrated circuit (ASIC), a programmable logic device (PLD), or a field programmable gate array (FPGA) or all or some of the functional blocks may be implemented by hardware. For example, the processor 1001 may be implemented using at least one of these pieces of hardware.

Summary of Embodiment

As described above, according to the embodiment of the present invention, a terminal including a reception unit that receives, from a base station, information for requesting a terminal capability report related to a wake-up signal associated with a paging occasion and configuration information related to at least one of a first wake-up signal and a second wake-up signal, a transmission unit that transmits the terminal capability report related to the wake-up signal to the base station, and a control unit that determines configurations of the first wake-up signal and configurations of the second wake-up signal based on the configuration information related to the wake-up signal, in which the reception unit receives the wake-up signal and paging associated with the wake-up signal from the base station, and the control unit determines the configurations of the first wake-up signal from a value based on the configurations of the second wake-up signal is provided.

With the above configuration, the base station 10 and the terminal 20 can efficiently transmit and receive the signaling of the configurations related to the Release 16_WUS using the configurations related to the Release 15_WUS. In other words, the signaling efficiency in the wireless communication system can be improved.

In a case where the configurations of the first wake-up signal are not included in the configuration information related to the wake-up signal, the control unit may use the configurations of the second wake-up signal included in the configuration information related to the wake-up signal in the configurations of the first wake-up signal. With this configuration, the terminal 20 can efficiently determine the signaling of the configurations related to the Release 16_WUS by using the configurations related to the Release 15_WUS.

The control unit may: determine a time interval between the wake-up signal and a first associated paging occasion and a supported minimum time interval between the wake-up signal and the first associated paging occasion in the configuration of the first wake-up signal, from same values as in the configuration of the second wake-up signal or from offsets based on the configuration of the second wake-up signal; determine a period of the wake-up signal and a number of paging occasions associated with the wake-up signal in the configuration of the first wake-up signal, from same values as in the configuration of the second wake-up signal or from integer multiples of the values in the configuration of the second wake-up signal; and determine a frequency position of the wake-up signal in the configuration of the first wake-up signal, from the same value as in the configuration of the second wake-up signal or from positions excluding frequency positions in the configuration of the second wake-up signal. With this configuration, the terminal 20 can efficiently determine the signaling of the configurations related to the Release 16_WUS by using the configurations related to the Release 15_WUS.

In a case where information indicating that the first wake-up signal is supported is included in the terminal capability report related to the wake-up signal, the transmission unit may not include information indicating whether or not the second wake-up signal is supported in the terminal capability report related to the wake-up signal. With this configuration, the terminal 20 can efficiently notify the base station 10 of the signaling of the UE capabilities related to the Release 15_WUS using the UE capabilities related to the Release 16_WUS.

According to an embodiment of the present invention, a base station including a transmission unit that transmits, to a terminal, information for requesting a terminal capability report related to an wake-up signal associated with a paging occasion and configuration information related to at least one of a first wake-up signal and a second wake-up signal, a reception unit that receives a terminal capability report related to the wake-up signal from the terminal, and a control unit that includes configurations of the first wake-up signal and configurations of the second wake-up signal in configuration information of the wake-up signal, in which the transmission unit transmits the wake-up signal and paging associated with the wake-up signal to the terminal, and the control unit determines the configurations of the first wake-up signal from a value based on the configurations of the second wake-up signal.

With the above configuration, the base station 10 and the terminal 20 can efficiently transmit and receive the signaling of the configurations related to the Release 16_WUS using the configurations related to the Release 15_WUS. In other words, the efficiency of the signaling in the wireless communication system can be improved.

Also, according to an embodiment of the present invention, a communication method including the following steps executed by a terminal: a reception step of receiving, from a base station, information for requesting a terminal capability report related to an wake-up signal associated with a paging occasion and configuration information related to at least one of a first wake-up signal and a second wake-up signal; a transmission step of transmitting the terminal capability report related to the wake-up signal to the base station; and a control step of deciding configurations of the first wake-up signal and configurations of the second wake-up signal based on the configuration information related to the wake-up signal, in which the reception step includes a step of receiving the wake-up signal and paging associated with the wake-up signal from the base station, and the control step includes a step of deciding the configurations of the first wake-up signal from a value based on the configurations of the second wake-up signal.

With the above configuration, the base station 10 and the terminal 20 can efficiently transmit and receive the signaling of the configurations related to the Release 16_WUS using the configurations related to the Release 15_WUS. In other words, the signaling efficiency in the wireless communication system can be improved.

Supplement of Embodiment

The exemplary embodiment of the present invention has been described above, but the disclosed invention is not limited to the above embodiments, and those skilled in the art would understand various modified examples, revised examples, alternative examples, substitution examples, and the like. In order to facilitate understanding of the invention, specific numerical value examples have been used for description, but the numerical values are merely examples, and certain suitable values may be used unless otherwise stated. The classification of items in the above description is not essential to the present invention, matters described in two or more items may be combined and used if necessary, and a matter described in one item may be applied to a matter described in another item (unless inconsistent). The boundary between functional units or processing units in a functional block diagram does not necessarily correspond to the boundary between physical parts. Operations of a plurality of functional units may be performed physically by one component, or an operation of one functional unit may be physically performed by a plurality of parts. In the processing procedure described in the embodiments, the order of the processes may be changed as long as there is no inconsistency. For the sake of convenience of processing description, the base station 10 and the user terminal 20 have been described using the functional block diagrams, but such devices may be implemented by hardware, software, or a combination thereof. Software executed by the processor included in the base station 10 according to the embodiment of the present invention and software executed by the processor included in the user terminal 20 according to the embodiment of the present invention may be stored in a random access memory (RAM), a flash memory, a read only memory (ROM), an EPROM, an EEPROM, a register, a hard disk (HDD), a removable disk, a CD-ROM, a database, a server, or any other appropriate storage medium.

Further, a notification of information is not limited to the aspect or embodiment described in the present disclosure and may be given by any other method. For example, the notification of information may be given by physical layer signaling (for example, downlink control information (DCI) or uplink control information (UCI)), upper layer signaling (for example, radio resource control (RRC) signaling, medium access control (MAC) signaling, broadcast information (master information block (MIB), system information block (SIB))), other signals, or a combination thereof. Further, the RRC signaling may be referred to as an RRC message and may be, for example, an RRC connection setup message, an RRC connection reconfiguration message, or the like.

Each aspect and embodiment of the present invention may be applied to at least one of Long Term Evolution (LTE), LTE-advanced (LTE-A), SUPER 3G, IMT-advanced, 4th generation mobile communication system (4G), 5th generation mobile communication system (5G), Future Radio Access (FRA), New Radio (NR), W-CDMA (registered trademark), GSM (registered trademark), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), a system using any other appropriate system, a next generation systems extended based on these standards, or the like. Further, a plurality of systems may be combined and applied (for example, a combination of at least one of LTE and LTE-A and 5G or the like).

The processing procedures, the sequences, the flowcharts, and the like of the respective aspects/embodiments described in this specification may be reversed in order unless there is a contradiction. For example, the method described in the present disclosure presents elements of various steps using an exemplary order and is not limited to a presented specific order.

In this specification, a specific operation that is supposed to be performed by the base station 10 may be performed by an upper node in some cases. In the network including one or more network nodes including the base station 10, various operations performed for communication with the user terminal 20 can be obviously performed by at least one of the base station and any network node (for example, an MME, an S-GW, or the like is considered, but it is not limited thereto) other than the base station 10 and/or the base station 10. The example in which the number of network nodes excluding the base station 10 is one has been described above, but other network nodes in which a plurality of other network nodes (for example, an MME and an S-GW) are combined may be provided.

Information, a signal, or the like described in the present disclosure may be output from an upper layer (or a lower layer) to a lower layer (or an upper layer). Information, a signal, or the like described in the present disclosure may be input and output via a plurality of network nodes.

Input and output information and the like may be stored in a specific place (for example, a memory) or may be managed through a management table. Input and output information and the like may be overwritten, updated, or additionally written. Output information and the like may be deleted. Input information and the like may be transmitted to another device.

The determination the present disclosure may be performed in accordance with a value (0 or 1) indicated by one bit, may be performed in accordance with a Boolean value (true or false), or may be performed by a comparison of numerical values (for example, a comparison with a predetermined value).

Software can be interpreted widely to mean a command, a command set, a code, a code segment, a program code, a program, a subprogram, a software module, an application, a software application, a software package, a routine, a subroutine, an object, an executable file, an execution thread, a procedure, a function, and the like regardless of whether software is called software, firmware, middleware, a microcode, a hardware description language, or any other name.

Further, software, commands, information, and the like may be transmitted and received via a transmission medium. For example, when software is transmitted from a web site, a server, or any other remote source using at least one of a wired technology (such as a coaxial cable, a fiber optic cable, a twisted pair, or a digital subscriber line (DSL)) and a radio technology (such as infrared rays or a microwave), at least one of the wired technology and the radio technology are included in a definition of a transmission medium.

Information, signals, and the like described in this specification may be indicated using any one of a variety of different techniques. For example, data, instructions, commands, information, signals, bits, symbols, chips, and the like which are mentioned throughout the above description may be indicated by voltages, currents, electromagnetic waves, magnetic particles, optical fields or photons, or an arbitrary combination thereof.

The terms described in the present disclosure and terms necessary for understanding the present disclosure may be replaced with terms having the same or similar meanings. For example, at least one of a channel and a symbol may be a signal. Further, a signal may be a message. Further, a component carrier (CC) may be referred to as a "carrier frequency", a "cell", or the like.

The terms "system" and "network" used in the present disclosure are used interchangeably.

Further, information, parameters, and the like described in the present disclosure may be indicated by absolute values, may be indicated by relative values from predetermined values, or may be indicated by corresponding other information. For example, radio resources may be those indicated by an index.

The names used for the above-described parameters are not limited in any respect. Further, mathematical formulas or the like using the parameters may be different from those explicitly disclosed in the present disclosure. Since various channels (for example, a PUCCH, a PDCCH, and the like) and information elements can be identified by suitable names, various names allocated to the various channels and the information elements are not limited in any respect.

In the present disclosure, the terms "base station (BS)", "radio base station", "base station", "fixed station", "Node B", "eNode B (eNB)", "gNodeB (gNB)", "access point", "transmission point", "reception point", "transmission/reception point", "cell", "sector", "cell group", "carrier", "component carrier", and the like can be used interchangeably. The base stations may also be indicated by terms such as a macrocell, a small cell, a femtocell, and a picocell.

The base station eNB can accommodate one or more (for example, three) cells. In a case where the base station accommodates a plurality of cells, the entire coverage area of the base station can be partitioned into a plurality of small areas, and each small area can provide a communication service through a base station subsystem (for example, a small indoor base station (a remote radio head (RRH)). The term "cell" or "sector" refers to the whole or a part of the coverage area of at least one of the base station and the base station subsystem that performs a communication service in the coverage.

In the present disclosure, the terms "mobile station (MS)", "user terminal", "user equipment (UE)", "terminal", and the like can be used interchangeably.

The mobile station may be a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, It may also be referred to as a remote terminal, handset, user agent, mobile client, client, or some other suitable term.

At least one of the base station and the mobile station may be also referred to as a transmitting device, a receiving device, a communication device, or the like. At least one of the base station and the mobile station may be a device installed in a mobile body, a mobile body itself, or the like. The moving body may be a vehicle (for example, a car, an airplane, or the like), a moving body that moves unmanned (for example, a drone, an autonomous car or the like), or a robot (manned type or unmanned type). At least one of the base station and the mobile station includes a device which need not necessarily move during a communication operation. For example, at least one of the base station and the mobile station may be an Internet of things (IoT) device such as a sensor.

Further, the base station in the present disclosure may be replaced with a user terminal. For example, each aspect/embodiment of the present disclosure may be applied to a configuration in which communication between the base station and the user terminal is replaced with communication between a plurality of user terminal 20 (for example, which may be referred to as device-to-device (D2D) or vehicle-to-everything (V2X)). In this case, the user terminal 20 may have the functions of the base station 10 described above. Further, the terms "uplink" and "downlink" may be replaced with terms (for example, "side") corresponding to inter-terminal communication. For example, an uplink channel, a downlink channel, or the like may be read with side channels.

Similarly, the user terminal in the present disclosure may be replaced with the base station. In this case, the base station may have the functions of the above-mentioned user terminal.

The terms "determining" and "deciding" used in this specification may include a wide variety of actions. For example, "determining" and "deciding" may include, for example, events in which events such as judging, calculating, computing, processing, deriving, investigating, looking up, search, and inquiry (for example, looking up in a table, a database, or another data structure), or ascertaining are regarded as "determining" or "deciding". Further, "determining" and "deciding" may include, for example, events in which events such as receiving (for example, receiving information), transmitting (for example, transmitting information), input, output, or accessing (for example, accessing data in a memory) are regarded as "determining" or "deciding". Further, "determining" and "deciding" may include, for example, events in which events such as resolving, selecting, choosing, establishing, or comparing are regarded as "determining" or "deciding". In other words, "determining" and "deciding" may include events in which a certain operation is regarded as "determining" or "deciding". Further, "determining (deciding)" may be replaced with "assuming", "expecting", "considering", or the like.

Terms "connected", "coupled", or variations thereof means any direct or indirect connection or coupling between two or more elements and may include the presence of one or more intermediate elements between two elements which are "connected" or "coupled". The coupling or the connection between the elements may be physical, logical, or a combination thereof. For example, "connection" may be replaced with "access". In a case where used in the present disclosure, two elements may be considered to be "connected" or "coupled" with each other using at least one of one or more electric wires, cables and/or a printed electrical connection or using electromagnetic energy having a wavelength in a radio frequency domain, a microwave region, or an light (both visible and invisible) region as non-limiting and non-exhaustive examples.

A reference signal may be abbreviated as RS and may be referred to as a pilot, depending on a standard to be applied.

A phrase "based on" used in the present disclosure is not limited to "based on only" unless otherwise stated. In other words, a phrase "based on" means both "based on only" and "based on at least".

Any reference to an element using a designation such as "first", "second", or the like used in the present disclosure does not generally restrict quantities or an order of those elements. Such designations can be used in the present disclosure as a convenient method of distinguishing two or more elements. Thus, reference to the first and second elements does not mean that only two elements can be adopted there, or the first element must precede the second element in a certain form.

Further, "means" in the configuration of each of the above devices may be replaced with "unit", "circuit", "device", or the like.

In a case where "include", "including", and variations thereof are used in the present disclosure, these terms are intended to be comprehensive, similarly to a term "comprising". Further, the term "or" used in the present disclosure is intended not to be an exclusive disjunction.

A radio frame may include one or more frames in the time domain. In the time domain, each of one or more frames may be referred to as a sub frame. The sub frame may further include one or more slots in the time domain. The sub frame may have a fixed time length (for example, 1 ms) not depending on numerology.

The numerology may be a communication parameter applied to at least one of transmission and reception of a certain signal or channel. For example, the numerology may indicate at least one of a sub carrier spacing (SCS), a bandwidth, a symbol length, a cyclic prefix length, a transmission time interval (TTI), a number of symbols per TTI, a radio frame configuration, a specific filtering process performed in the frequency domain by a transceiver, a specific windowing process performed in the time domain by a transceiver, and the like.

The slot may include one or more symbols (orthogonal frequency division multiplexing (OFDM) symbols, single carrier frequency division multiple access (SC-FDMA) symbols, or the like) in the time domain. The slot may be a time unit based on the numerology.

The slot may include a plurality of mini slots. Each mini slot may include one or more symbols in the time domain. Further, the mini slot may be referred to as a sub-slot. The mini slot may include fewer symbols than a slot. A PDSCH (or PUSCH) transmitted in units of times greater than the mini slot may be referred to as a PDSCH (or PUSCH) mapping type A. A PDSCH (or PUSCH) transmitted using a mini slot may be referred to as a PDSCH (or PUSCH) mapping type B.

All of a radio frame, a sub frame, a slot, a mini slot, and a symbol indicates a time unit for transmitting a signal. As a radio frame, a sub frame, a slot, a mini slot, and a symbol, different designations respectively corresponding to them may be used.

For example, one sub frame may be referred to as a transmission time interval (TTI: Transmission Time Interval), or a plurality of consecutive sub frames may be referred to as TTIs, or one slot or one mini slot may be referred to as a TTI. In other words, at least one of the sub frame and the TTI may be a sub frame (1 ms) in the existing LTE, may be a period shorter than 1 ms (for example, 1 to 13 symbols), or may be referred to as a period longer than 1 ms. A unit representing the TTI may be referred to as slot, a mini slot, or the like instead of the sub frame.

Here, for example, the TTI refers to a minimum time unit of scheduling in wireless communication. For example, in the LTE system, the base station performs scheduling of allocating a radio resource (a frequency bandwidth, a transmission power, or the like which can be used in each user terminal 20) to each user terminal 20 in units of TTIs. The definition of the TTI is not limited thereto.

The TTI may be a transmission time unit such as a channel coded data packet (transport block), a code block, or a code word, or may be a processing unit such as scheduling or link adaptation. Further, when a TTI is given, a time interval (for example, the number of symbols) in which a transport block, a code block, a code word, or the like is actually mapped may be shorter than the TTI.

Further, when one slot or one mini slot is referred to as a TTI, one or more TTIs (that is, one or more slots or one or more mini slots) may be a minimum time unit of scheduling.

Further, the number of slots (the number of mini slots) constituting the minimum time unit of scheduling may be controlled.

A TTI having a time length of 1 ms may be referred to as a common TTI (TTI in LTE Rel. 8 to 12), a normal TTI, a long TTI, a common sub frame, a normal sub frame, a long sub frame, a slot, or the like. A TTI shorter than the common TTI may be referred to as a reduced TTI, a short TTI, a partial TTI (a partial or fractional TTI), a reduced sub frame, a short sub frame, a mini slot, a sub slot, a slot, or the like.

Further, a long TTI (for example, a common TTI, a sub frame, or the like) may be replaced with a TTI having a time length exceeding 1 ms, and a short TTI (for example, a reduced TTI or the like) may be replaced with a TTI having a TTI length which is less than a TTI length of a long TTI and equal to or more than 1 ms.

The resource block (RB) is a resource allocation unit in the time domain and the frequency domain and may include one or more consecutive subcarriers in the frequency domain. The number of sub carriers included in an RB may be the same irrespective of a numerology and may be, for example, 12. The number of sub carriers included in an RB may be determined based on a numerology.

Further, a time domain of an RB may include one or more symbols and may be a length of one slot, one mini slot, one sub frame, or one TTI. Each of one TTI, one sub frame, or the like may be constituted by one or more resource blocks.

Further, one or more RBs may be referred to as a physical resource block (PRB), a sub carrier group (SCG), a resource element group (REG), a PRB pair, an RB pair, or the like.

Further, the resource block may be constituted by one or more resource elements (RE). For example, one RE may be a radio resource region of one subcarrier and one symbol.

A bandwidth part (BWP) (which may be referred to as a partial bandwidth) may indicate a subset of consecutive common resource blocks (RBs) for a certain numerology in a certain carrier. Here, a common RB may be specified by an index of an RB based on a common reference point of a carrier. A PRB may be defined in a BWP and numbered in a BWP.

The BWP may include a BWP for UL (UL BWP) and a BWP for DL (DL BWP). In a UE, one or more BWPs may be configured within one carrier.

At least one of configured BWPs may be active, and it may not be assumed that the UE transmits and receives a predetermined signal/channel outside an active BWP. Further, a "cell", a "carrier", or the like in the present disclosure may be replaced with a "BWP".

Structures of the radio frame, the sub frame, slot, the mini slot, and the symbol are merely examples. For example, configurations such as the number of sub frames included in a radio frame, the number of slots per sub frame or radio frame, the number of mini slots included in a slot, the number of symbols and RBs included in a slot or a mini slot, the number of sub carriers included in an RB, the number of symbols in a TTI, a symbol length, a cyclic prefix (CP) length, and the like can be variously changed.

In the entire present disclosure, for example, when an article such as "a", "an", or "the" in English is added by a translation, the present disclosure may include a case in which a noun following the article is the plural.

In the present disclosure, a term "A and B are different" may mean "A and B are different from each other". Further, the term may mean "each of A and B is different from C". Terms such as "separated", "coupled", or the like may also be interpreted in similarly to "different".

Each aspect/embodiment described in this specification may be used alone, in combination, or may be switched in accordance with the execution. Further, notification of predetermined information (for example, notification of "being X") is not limited to being performed explicitly, but may be performed by implicit (for example, by giving no notification of predetermined information).

In the present disclosure, the PO is an example of a paging occasion. The WUS is an example of the wake-up signal. The Release 16_WUS is an example of a first wake-up signal. The Release 15_WUS is an example of a second wake-up signal. UECapabilityEnquiry is an example of information for requesting a terminal capability report. UECapabilityinformation is an example of the terminal capability report. The transmission unit 210 or the reception unit 220 is an example of a communication unit. wakeUpSignal-r16 is an example of information indicating whether or not the first wake-up signal is supported. wakeUpSignal-r15 is an example of information indicating whether or not the second wake-up signal is supported. The transmission unit 110 or the reception unit 120 is an example of a communication unit.

Although the present disclosure has been described above in detail, it is obvious to those skilled in the art that the present disclosure is not limited to the embodiments described in the present disclosure. The present disclosure may be implemented as revised and modified forms without departing from the gist and scope of the present disclosure as configured forth in claims. Therefore, the description of the present disclosure is for the purpose of illustration and does not have any restrictive meaning to the present disclosure.

EXPLANATIONS OF LETTERS OR NUMERALS

10 BASE STATION
110 TRANSMISSION UNIT
120 RECEPTION UNIT
130 CONFIGURATION UNIT
140 CONTROL UNIT
20 TERMINAL
210 TRANSMISSION UNIT
220 RECEPTION UNIT
230 CONFIGURATION UNIT
240 CONTROL UNIT
1001 PROCESSOR
1002 STORAGE DEVICE
1003 AUXILIARY STORAGE DEVICE
1004 COMMUNICATION DEVICE
1005 INPUT DEVICE
1006 OUTPUT DEVICE

The invention claimed is:

1. A terminal comprising:
a reception unit configured to receive at least one of first configuration information and second configuration information that are related to a wake-up signal associated with a paging occasion, from a base station; and
a control unit configured to determine, with respect to a frequency position of the wake-up signal, the frequency position according to the first configuration information, from a position excluding a frequency position according to the second configuration information,
wherein when the first configuration information does not include the configuration of a time offset of the wake-up signal, the configuration corresponding to the configuration of the time offset included in the second configuration information is used as the configuration of the first configuration information.

2. The terminal according to claim 1, wherein the control unit determines the time offset of the wake-up signal, using the second configuration information.

3. The terminal according to claim 2, wherein the first configuration information is configuration information related to a wake-up signal associated with a group.

4. The terminal according to claim 1, wherein, in a case where the first configuration information includes a configuration that has not been received, the control unit uses a configuration that is included in the second configuration information, and that corresponds to the configuration that has not been received, as the configuration of the first configuration information.

5. The terminal according to claim 4, wherein the first configuration information is configuration information related to a wake-up signal associated with a group.

6. The terminal according to claim 1, wherein the first configuration information is configuration information related to a wake-up signal associated with a group.

7. A base station comprising:
a transmission unit configured to transmit at least one of first configuration information and second configuration information that are related to a wake-up signal associated with a paging occasion, to a terminal; and
a control unit configured to determine, with respect to a frequency position of the wake-up signal, the frequency position according to the first configuration information, from a position excluding a frequency position according to the second configuration information,
wherein when the first configuration information does not include the configuration of a time offset of the wake-up signal, the configuration corresponding to the configuration of the time offset included in the second configuration information is used as the configuration of the first configuration information.

8. A communication system comprising: a base station; and a terminal, wherein
the base station includes:
a transmission unit configured to transmit at least one of first configuration information and second configuration information that are related to a wake-up signal associated with a paging occasion, to the terminal; and
a control unit configured to determine, with respect to a frequency position of the wake-up signal, the frequency position according to the first configuration information, from a position excluding a frequency position according to the second configuration information, and
the terminal includes:
a reception unit configured to receive at least one of first configuration information and second configuration information that are related to a wake-up signal associated with a paging occasion, from a base station; and
a control unit configured to determine, with respect to the frequency position of the wake-up signal, the frequency position according to the first configuration information, from the position excluding the frequency position according to the second configuration information,
wherein when the first configuration information does not include the configuration of a time offset of the wake-up signal, the configuration corresponding to the configuration of the time offset included in the second configuration information is used as the configuration of the first configuration information.

9. A communication method of a terminal, the method comprising:

receiving at least one of first configuration information and second configuration information that are related to a wake-up signal associated with a paging occasion, from a base station; and determining, with respect to the frequency position of the wake-up signal, the frequency position according to the first configuration information, from the position excluding the frequency position according to the second configuration information, wherein when the first configuration information does not include the configuration of a time offset of the wake-up signal, the configuration corresponding to the configuration of the time offset included in the second configuration information is used as the configuration of the first configuration information.

* * * * *